United States Patent [19]

Sakaitani et al.

[11] Patent Number: 4,917,927
[45] Date of Patent: Apr. 17, 1990

[54] SYNTHETIC RESIN MOLDINGS AND METHOD FOR THE MANUFACTURE THEREOF

[76] Inventors: Katsutoshi Sakaitani, No. 24-22, 6-chome, Shinjukucho; Hiroyuki Nakamura, No. 22-6, Wakitahoncho, both of Kawagoe-shi, Saitama-ken; Kiyoshi Miyagi, No. 7-3, Kobushi-cho, Tokorozawa-shi, Saitama-ken, all of Japan

[21] Appl. No.: 245,679

[22] Filed: Sep. 19, 1988

[30] Foreign Application Priority Data

May 26, 1988 [JP] Japan .................. 63-129693

[51] Int. Cl.$^4$ ............................................. B05D 3/06
[52] U.S. Cl. ..................... 428/40; 428/195; 428/412; 428/522; 428/332; 428/333; 428/334; 428/337; 428/339; 264/129; 264/132; 264/240; 264/241; 101/129; 427/256; 427/261
[58] Field of Search ............. 428/40, 195, 412, 522, 428/332, 337, 339, 333, 334; 101/129; 264/129, 132, 240, 241; 427/256, 261

[56] References Cited

U.S. PATENT DOCUMENTS 4,804,569 2/1989 Arisawa ..................... 428/40

FOREIGN PATENT DOCUMENTS 0156746 9/1984 Japan .

*Primary Examiner*—Patrick Ryan
*Attorney, Agent, or Firm*—Fleit, Jacobson, Cohn, Price, Holman & Stern

[57] ABSTRACT

Moldings possessing a front or rear layer of different properties and capable of backlighting, and a method for the manufacture thereof by proceeding so that after printing, by means of the screen printing method, in such a manner that the thickness of the ink layer, applied as a simple layer on a 0.1 mm-2.0 mm thick synthetic resin sheet, will be 4μ or more (preferably 5μ or more), or that the thickness of the ink film layer, applied in two or more layers, will be 8μ or more (preferably 10μ or more), or, alternatively, that the thickness of the ink film applied as a simple layer will be 4μ or more (preferably 5μ or more) and the thickness of the ink layer applied in two or more layers will be 8μ or more (preferably 10μ or more), and after processing in a form so that the synthetic resin sheet thus printed can be charged inside the molding die, the die is charged so that said synthetic resin sheet is adjacent to the inner surface of the die, whereupon the molten resin for the forming of the molding is injection-molded after said die has been closed.

10 Claims, 1 Drawing Sheet

SYNTHETIC RESIN MOLDINGS AND METHOD FOR THE MANUFACTURE THEREOF

BACKGROUND OF THE INVENTION

1. Field of the Invention

The present invention relates to synthetic resin moldings with a front and rear layer of different properties whereby the front layer bears a printed surface capable of backlighting (that is, capable of making the pictorial image or lettering printed thereupon look bright if light is shone from the rear of the product and when viewed from the front), and to a method for the manufacture thereof.

The present invention falls under the International Patent Classifications B29F, F10, B29D11/00, and B29D31/00.

2. Description of the Prior Art

It is common knowledge that backlighting products (that is, products capable of making the pictorial image or lettering printed thereupon look bright if light is shone from the rear of the product and when viewed from the front), are used in various panels including automobile instrument panels and front panels of audio products.

These products are manufactured by imparting a printed image on to a synthetic resin sheet and on to synthetic resin moldings.

When a printed image is imparted on to a synthetic resin sheet (hereinafter referred to as sheet by way of abbreviation), it is possible to manufacture a multiplicity of 30 or 40 products simultaneously if a sheet having a large surface area is employed. If, however, a printed image is imparted on to a synthetic resin molding (hereinafter referred to as molding by way of abbreviation), it is possible to manufacture only a very small number of a mere two or four simultaneously, thereby resulting in a low productivity.

Even if a multiplicity of moldings were printed simultaneously, it would, consequently, be extremely complicated and expensive to produce the holding jigs for securing these moldings. And, further, even if it were possible to produce high-accuracy holding jigs, the print surfaces of the multiplicity of moldings would have slightly different heights due to variations in the molded products so that it would not be possible to achieve high-quality products, and the operating result would be most likely to give a low production yield.

Furthermore, the printing of moldings is a laborious operation in view of the extensive product handling requirements so that it requires approximately double the number of operators than sheet printing does.

Moreover, if multi-color printing is applied, the moldings require repeated washing and handling to thoroughly remove dust and dirt particles from the surface so that some impact forces, minor though they may be individually, will be applied to the molding. Under the cumulative action of these frequently repeated impact forces, however, the moldings will, in the course of time, fracture, and protruding parts will break off.

For the printing of moldings it is essential that the print surface should be flat. Yet, even if the molding itself is flat, the holding jig tends to result in minor incurvation and sloping of the surface, thereby causing a reduction in product quality and thus a drop in the production yield.

Further, moldings are not always flat and will occasionally be found to have convexities or concavities on one or many of their surfaces.

Furthermore, certain parts may have convexities and concavities on their surfaces.

This renders the surface incapable of being printed, except by the special printing technique known as pad printing.

While printing by the pad printing method may produce surfaces that appear perfect on cursory inspection, it cannot meet the essential objective, since, with the use of backlighting, a process deemed necessary also for molding such as automobile instrument panels and audio products, and entailing that the printed pattern and lettering should stand out clearly against the light shone from the rear, the printed pattern and lettering that should stand out clearly will appear to be riddled with pinholes while the other (normally black background) parts are suffused with light resulting in a pattern similar to that of a star-speckled sky at night.

Apart from those printing techniques involving the direct application of print on to the molding, the following methods are available for providing a print surface to the molding.

One such method is known as the Simultranser System (in-mold technique). This is a fully integrated molding and printing system in which a transfer image foil is positioned inside the injection molding die and the image is transferred onto the molding in the molding process, so that the molding process and the transfer image application process are accomplished in a single operation.

The problem associated with this process, however, lies in the fact that since only the ink film layer printed on the film is transferred on to the molding during the molding process, the weld lines and gate marks generated on the molding cannot be concealed so that the product's appearance suffers.

Another such method is known as the heat transfer system, a process in which a printed area (pattern), that is, a pattern printed on a film, is heat-transferred on to a molding by means of a hot stamping device.

SUMMARY OF THE INVENTION

The purpose of the present invention is therefore to provide a method for the manufacture, at high quality and high productivity, of moldings imparted with a printed area and capable of backlighting.

The inventors of the present invention have, as a result of the most dedicated and advanced research designed to overcome the above problems, found out and discovered that it is possible to manufacture, at high quality and high productivity, moldings possessing a front and rear surface endowed with layers of different properties and capable of backlighting, by printing a synthetic resin sheet first by means of the screen printing process, by then processing this in a manner so that the synthetic resin sheet thus printed can be charged into the synthetic resin molding die, and by finally injection-molding the molten resin after charging said synthetic resin sheet therein and closing the die.

Thus, the present invention provides moldings possessing a front or rear layer of different properties and capable of backlighting, and a method for the manufacture thereof by proceeding so that after printing, by means of the screen printing method, in such a manner that the thickness of the ink layer, applied as a simple layer on a 0.1 mm–2.0 mm thick synthetic resin sheet, will be 4μ or more (preferably 5μ or more), or that the thickness of the ink film layer, applied in two or more layers, will be 8μ or more (preferably 10μ or more), or, alternatively, that the thickness of the ink film applied as a simple layer will be 4μ or more (preferably 5μ or more) and the thickness of the ink layer applied in two or more layers will be 8μ or more (preferably 10μ or more), and after processing in a form so that the synthetic resin sheet thus printed can be charged inside the molding die, the die is charged so that said synthetic resin sheet is adjacent to the inner surface of the die, whereupon the molten resin for the forming of the molding is injection-molded after said die has been closed.

DESCRIPTION OF THE PREFERRED EMBODIMENTS

Figure 1:
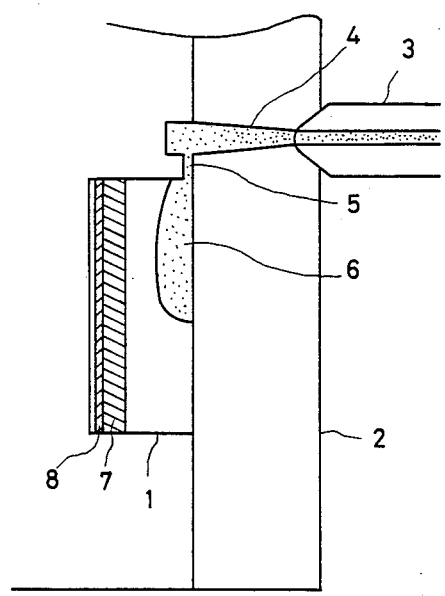
FIG. 1 is a partial cross-sectional view designed to explain an example of an embodiment of the present invention.

The synthetic resin sheet used in accordance with the present invention is required to have a thickness from and including 0.1 mm up to and including 2.0 mm.

If it has a thickness of less than 0.1 mm, its mechanical strength is not adequate when charged into the die and it may separate from the die surface due to the structure of the die.

Further, it will partially melt under the influence of the high temperature of the molten resin in the die so that it will not be able to retain its shape.

Conversely, if the sheet has a thickness greater than 2.0 mm it will not present problems when charged into the die but will be a limiting factor when processing it to such a shape that it can be charged into the die after it has been printed, a problem that may arise when using a punch die.

Since the processing operation has been performed by cutting with a circular saw, for example, productivity will have been substantially reduced so that this operation is not feasible as an industrial production process.

Moreover, when the die surface is curved, the sheet, if thicker than 2.0 mm, will not orient itself along the die surface even when the molten resin is injection-molded, so that the desired moldings cannot be obtained.

A major feature of the present invention is that it permits printing on the curved surface areas of moldings with curved surfaces. Yet, if a sheet of more than 2 mm thickness is used, the intentions of this invention will be deviated from.

If the above synthetic resin sheet is printed by means of a screen printing process, the thickness of the ink film layer applied as a single layer must be 4μ or more.

This thickness is the thickness after the ink has been allowed to dry after printing.

The screen printing technique is ideally suited for increasing the thickness of the ink film.

Other printing methods produce only a thin ink film of 1μ thickness or less at one pass.

If the ink film has a thickness of less than 4μ, the result will be the emergence of pinholes so that the backlighting capability cannot be achieved.

If the printed section is black and forms the background (that is, if there are no patterns and/or lettering), it will be necessary to superimpose two print layers so as to obtain an ink film thickness of 8μ or more.

This is required because background sections tend to give rise to pinholes more easily than printed patterns and lettering do only in the large surface areas, thereby leading to light effusion due to backlighting.

To charge a synthetic resin sheet printed in the manner described above, it is processed to the shape of the die aperture.

If the sheet is thin, it may be cut with scissors or shears, and if it is thick, it may be cut with a circular saw, although this does not raise productivity.

It is therefore necessary to cut the sheet to the required shape in a punching operation by preparing a punch die and mounting it on to a press for punching.

If the molding has perforations, the punch die should be prepared so that perforations of the same dimensions and shape are obtained.

The punching dimensions for the printed sheet will differ according as to the requirements specified for the moldings.

If the printed sheet is stuck around the molding to cover it as far as the side surfaces, the sheet should be punched out to a size that exceeds the size of the aperture of the molding die, and this only by the required dimensions, and if it is an angular-shaped molding, the four corners should be cut off.

After this, the parts around the sides are folded over to impart a certain box-shape configuration.

If the molding surface and the printed sheet surface have the same dimensions, the printed sheet may be punched out to correspond to the die aperture.

In the two cases above, no problem will occur when the printed sheet is charged into the die.

The same also applies if the moldings have perforations.

In this case, the perforations made in the printed sheet should have the same dimensions as the molding die. If the molded resin surface is to be exposed at the periphery of the surfaces of the moldings, the printed sheet should be made smaller only by the dimensions to be exposed.

In this case, minute apertures are made in the die and these perforations are connected to a vacuum machine to draw a vacuum so that the printed sheet inserted in the die is firmly positioned and held on the molding die, with the center of the die surface accurately aligned with the center of the printed sheet.

The printed sheet is charged into the die in the manner described above and the die is closed to inject the molten resin for injection molding.

The path (gate) through which the molten resin is introduced into the die should preferably be such that it does not directly come into contact with the printed sheet.

If the molten resin is brought in direct contact with the sheet, the sheet may easily be destroyed under the influence of the high temperature and pressure of the molten resin.

EXAMPLES

Example 1

Square-shaped white printed patterns of 105 mm side length were applied by the screen printing method on to a polycarbonate sheet of 0.5 mm thickness, 670 mm height, and 450 mm width, the number of squares totalling 24, being 6 lines×4 stages at 3 mm spacing in the horizontal.

The ink film thickness in these white print patterns was 8μ. Printing was performed with black ink in such a manner that speed markings from 0km/hr to 200km/hr and lettering were applied, at a pitch of 1km/hr, as white marks on the black background on a circular arc over an angle range of 120 degrees, said circular arc of 45 mm radius being located within each of the squares and having the same center as said squares, that is, being concentric therewith, said white markings and the white lettering having a width of 0.5 mm width and a length of 6 mm. Alternatively, such white blanked-out markings and the white lettering of 2.0 mm width and 10 mm length, respectively, were applied at a pitch of 10 km/hr..

All parts other than the punch markings and the punch lettering were black, in other words, they formed the background.

Printing with this black ink was performed twice, with the second printing being superimposed upon the first printing.

The film thickness after the superimposed double black ink print application was a total of 15μ.

The time required for printing amounted to 37 seconds, and the yield was approximately 96% since one reject had been encountered.

The printing was carried out by one printshop operator.

This printed sheet was punched with a punching die, along the white printed portion, to form a sheet of 105 mm square to conform to the dimension of the 105 mm square.

This sheet was charged into the cavity of the molding die, made in such a manner that a molding of 3 mm thickness in the form of a square of 105 mm side length was obtained.

No particular devices and jigs were required for charging the sheet into the die cavity, as the operation was most easily performed manually taking approximately one second.

The printed surface of the sheet was charged so that it faced the surface of the die cavity and though it did not form a complete seal-contact with the die surface, this did not impede the molding process in any way.

The die was closed and the molten acrylic resin was injected for injection-molding under the normal conditions generally applied in this process.

The gate had been prepared in such a manner that it was parallel with the sheet.

The moldings thus obtained has a polycarbonate layer of 0.5 mm thickness and had white speed markings from 0 km/hr to 200 km/hr at an incremental pitch of 1 km/hr each and numbers in a square of 105 mm side length, with a thickness of 3 mm, while the surrounding background was black, and when light was shone from the rear (backlighting), the markings and numbers did stand out clearly. Nor were there any pinholes in the entire black background or any effusion of light. (See FIG. 1.)

Example 2

For the molding process, a die had been prepared in such a manner that 10 mm diameter perforations would appear in the molding by imparting 10 mm diameter projection onto the center part of the die described in Example 1, or in such a manner that the molding would intersect the die surface in a circle of 48 mm radius (with the center of the die surface and the center of the circle aligned) by providing spherical radius on the moving side of the die and by producing spherical indentations of the same dimensions so as to obtain a thickness of 3 mm on the fixed (immobile) side of the die. Except for the use of this die, the molding conditions were identical to those of Example 1.

The moldings thus obtained had white markings and lettering left blank on the inner periphery of the spherical recess, while the background was black and had an attractive three-dimensional appearance.

When backlighting was applied to this, the markings and lettering appeared to stand out very clearly, with no pinholes and no light effusion being visible on the black background.

Example 3

The molding described in Example 2 was taken and a die was prepared so that a frame of 3 mm thickness and 5 mm height was applied to its periphery.

Except for the fact that this was used and that a polycarbonate net was employed as the molding resin to obtain the molding, the molding process was performed under the same conditions as those given in Example 1.

The moldings thus obtained were 3 mm in thickness and 105 mm square, and the 0.5 mm surface layer had a polycarbonate section, with frame of 3 mm thickness and 5 mm height applied to the peripheral part thereof, and having white blanked-out markings and lettering on the inner periphery of the spherical recess while the background had an appealing black, three-dimensional appearance.

When backlighting was applied to this, the markings and lettering appeared to stand out very clearly, with no pinholes and conglomerations thereof and with no light effusion being visible on the black background.

Example 4

Except for the fact that on the white printing described in Example 1, band of 8 mm width were printed, with red ink, so that the markings became red between 120 km/hr and 200 km/hr, the molding process was performed by conducting a further printing operation, under the same conditions as described in Example 1.

The moldings thus obtained had the same shape as those of Example 1 and the lettering and the markings from 0 km/hr to 119 km/hr were blanked out white while the speed markings from 120 km/hr to 200 km/hr were blanked out red, while the other parts were black.

The film thickness of the white ink layer was 8μ while the film thickness of the red ink layer was μ, whereas the black ink layer which had been applied by superimposing two layers had a total film thickness of 16μ.

When backlighting was applied to this, the markings and lettering appeared to stand out very clearly, with no pinholes and no light effusion being visible on the black background.

Example 5

The thickness of the polycarbonate sheet used in Example 1 was made to be 2.0 mm and printing was performed in the same manner as in Example 1.

The film thickness of the white ink layer was 7μ and the film thickness of the black ink layer was 17μ.

Except for the fact that after punching out the above printed sheet to a 105 mm square, the thickness was 5 mm, the same molding die as that described in Example 1 was prepared and used, and the sheet inserted in the cavity of the die, the die closed and the molten resin injection-molded.

The thickness of the resin part for molding was 3 mm, and the total thickness including the sheet layer was 5 mm. This led to a product having the same appearance as that described in Example 1.

There was no pinhole formation detectable under backlighting.

Example 6

A white print was applied, by the screen printing method, to the entire surface area, except for a 5 mm section on each periphery, of a polycarbonate sheet of 0.2 mm thickness, 580 mm height, and 430 mm width.

The film thickness of this ink layer was $7\mu$.

Upon this, a total of 50 black print areas were applied at a pitch of 40 mm height and 110 mm width each, so that markings were obtained in the center from 0 to 100. In the marking area corresponding to 60 a yellow print, and in the marking area corresponding to 80 a red print was applied above the white print.

The respective film thicknesses were $9\mu$ for the yellow and $7\mu$ for the red print areas.

Upon this, blanked out markings and lettering were printed with black ink so that fine markings appeared at a pitch of 1 at a time from 0 to 100 and bold markings at a pitch of 10. Moreover, on one side or one sideline from these blanked-out markings and lettering, 0.5 mm large blanked-out markings and lettering were superimposed in black ink thereupon.

The total film thickness of the double black print was $20\mu$.

The time required for printing totalled 75 seconds. This is approximately 1/20th of the time required for printing the moldings directly.

The molding die was prepared so that moldings with a thickness dimension of 4 mm were obtained and had a short side of 4 cm and a long side of 11 cm, with the long side describing a circular arc of 130 mm radius.

The gate was provided parallel to the sheet at the end of ther long side of the die.

The above printed sheet was punched out with a punching die at a pitch of 4 cm height and 11 cm width so as to produce a short sheet for molding.

The sheet thus obtained was inserted into the cavity of the molding die (recessed side of molding) in such a manner that the non-printed surface came in contact with the die surface, when the dies was closed and the molten acrylic resin injection-molded under the generally applied conditions.

The moldings thus obtained had a short side of 4 cm and a long side of 11 cm, with the long side having a simply curved surface describing a circular arc of 130 mm radius, with the front surface having acrylic resin, and the rear surface, polycarbonate resin fused thereon.

The acrylic resin of the front surface impart an appearance of depth to the markings and lettering, and the application of backlighting showed no effusion of color.

The thicknesses of the ink films applied as single layers in each of the above Examples were $8\mu$, $6\mu$, $7\mu$ and $9\mu$, respectively, while the thicknesses of the ink films applied as double layers were $15\mu$, $16\mu$, $17\mu$ and $20\mu$, respectively. However, even when the former was $4\mu$, and the latter $8\mu$, the result was the same in that no light effusion was detectable.

COMPARISON 1

A molding of 3 mm thickness and 105 mm square was obtained by injection-molding using the die described in Example 1 and by using an acrylic resin.

Printing of the same nature as described in Example 1 was applied by preparing the setting jigs for the screen-printing of these moldings.

White, black, and black printed patterns were applied on a total of 24 moldings. The time required for this printing operation amounted to 432 seconds, that is, seven minutes and 12 seconds. This is roughly 12 times the time required for printing in Example 1 which amounted to only 37 seconds.

Even after allowing for the time required for charging the sheet into the molding die (37 seconds + 24 seconds = 61 seconds), the printing takes roughly seven times the time required in Example 1.

Even if the time required for punching with a punching die, so as to charge the sheet into the molding die, is counted and taken into consideration (61 seconds + 1 second/each × 24 = 85 seconds), it is clear that the printing time is roughly five times that of Example 1.

The operation was performed by one operator, and five rejects were encountered due to print misalignment and ink smudging resulting from flatness deficiencies in the moldings, so that the yield was 79.2 %.

However, no light effusion and pinholes were observed on backlighting.

COMPARISON 2

Moldings with 10 mm diameter perforations in the center were obtained, being 3 mm thick and 105 mm square and having a shape such that the spherical projection of 250 mm radius intersect with the planar surface in a circle of 96 mm diameter, by using the molding die described in Example 2 and by using an acrylic resin for injection molding.

These moldings were then printed with patterns of the same nature as those of Example 2 by using the PAD printing method.

The white ink film thickness was $1\mu$ and the black film applied in two layers had a total thickness of $1.8\mu$. When backlighting was applied, the light source was visible through the transparent product which was therefore wholly unfit for use.

COMPARISON 3

The moldings were prepared with surface layers of different properties by using a sheet printed by squeezing the ink in such a manner as to obtain a white ink film thickness of $3\mu$ and a superimposed double black ink film thickness totalling $7\mu$ as in Example 1. Upon backlighting, these moldings showed seven to eight pinholes in the white blanked-out parts whereas in the black background there were two or three pinholes so that these products were not suitable for use.

COMPARISON 4

When the 0.08 mm sheet of Example 1 was used and charged into the molding die after printing and punching-out, it was mechanically too weak to maintain its upright position and bent over. Molding was performed in this condition, when the sheet was found to cover only approximately two thirds of the surface area of the molding while one third of the molding resin was exposed.

COMPARISON 5

Printing was performed by using a sheet of 2.2 mm thickness instead of the sheet used in Example 5.

The punching die described in Example 5 was used for punching, but the punching operation was not possible to perform, and where punching was possible it left bad nicks and uneven edges so that the product was not fit for use so that the process was not pursued to the molding stage.

The present invention has the nature explained hereinabove and has the superior advantages described hereinbelow.

(1) Technical Simplicity

The present invention uses extremely simple technology in that a printed synthetic resin sheet is charged into a molding die and a molten resin injected into said molding die to obtain moldings that are capable of backlighting.

A further technical characteristic is the facility with which a printed surface with a thick ink film layer can be securely maintained in the side of the molding.

The charging of the sheet into the molding die at the time of molding is a simple operation.

(2) Molding with curved surfaces capable of backlighting It is possible to impart, with great ease, a printed surface with a thick film layer to the front or rear surface of the molding with one or several curved surfaces to achieve a backlighting capability.

(3) High Productivity

The process according to the present invention has a productivity several times that achievable with the direct printing of moldings.

(4) Low Reject Rate

The process according to the present invention is characterized by a much lower reject rate than that associated with the direct printing of moldings.

(5) Low Cost

The process according to the present invention has a low cost effect in that, by comparison with the direct printing of moldings on a one-by-one basis, it permits the simultaneous printing of a multiplicity of moldings.

(6) Attractive Appearance

The printed moldings obtained by the process according to the present invention are of an attractive appearance and do not present any of the weld lines and gate marks that tend to occur with such methods as the direct printing of moldings and the transfer-printing of an ink film from a printed film onto a molding.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A synthetic resin molding comprising an injection molded resin body and a synthetic resin sheet fusion-jointed to a surface of said injection molded resin body, said synthetic resin sheet having a thickness of 0.1 mm to 2.0 mm and at least one side of said synthetic resin sheet being printed with an ink film applied in one or more layers, each layer of said ink film having a thickness of at least 4 $\mu$.

2. A synthetic resin molding according to claim 1, wherein said synthetic resin sheet is printed with a first ink film applied in a single layer having a thickness of at least 4 $\mu$ and with a second ink film applied in at least two layers and having a thickness of at least 8 $\mu$.

3. A synthetic resin molding according to claim 1, wherein said synthetic resin sheet is printed on one side thereof.

4. A synthetic resin molding according to claim 1, wherein said synthetic resin sheet is printed on both sides thereof.

5. A method for manufacturing a synthetic resin molding, comprising the steps of:
   providing a synthetic resin sheet having a thickness of 0.1 mm to 2.0 mm;
   processing said synthetic resin sheet into a shape capable of being charged into a molding die;
   printing said synthetic resin sheet by applying an ink film to at least one side of said synthetic resin sheet, said ink film comprising one or more ink layers, each of said ink layers having a thickness of at least 4 $\mu$ after drying;
   charging said printed synthetic resin sheet into the molding die such that one side of said synthetic resin sheet is adjacent the inner surface of said molding die; and then
   injecting a molten synthetic resin into said molding die, thereby forming a synthetic resin molding comprising an injection molded body fusion-jointed to one side of said printed synthetic resin sheet.

6. A method according to claim 5, wherein said synthetic resin sheet is printed and then processed into a shape capable of being charged into the molding die.

7. A method according to claim 5, wherein said synthetic resin sheet is printed by applying said ink film to only one side of said synthetic resin sheet.

8. A method according to claim 7, wherein said printed synthetic resin sheet is charged into said molding die such that the side of the printed synthetic resin sheet having the ink film thereon is adjacent the inner surface of the molding die.

9. A method according to claim 7, wherein said printed synthetic sheet is charged into said molding die such that the side of the printed synthetic sheet having the ink film thereon is not adjacent the inner surface of the molding die.

10. A method according to claim 5, wherein said synthetic resin sheet is printed by screen printing.

* * * * *